(12) United States Patent
Kuhlhoff et al.

(10) Patent No.: US 12,092,248 B2
(45) Date of Patent: Sep. 17, 2024

(54) FLUID LINE COUPLING

(71) Applicant: ContiTech MGW GmbH, Hann. Münden (DE)

(72) Inventors: Florian Kuhlhoff, Hamburg (DE); Axel Flach, Bad Wildungen (DE)

(73) Assignee: ContiTech MGW GmbH, Hann. Münden (DE)

( * ) Notice: Subject to any disclaimer, the term of this patent is extended or adjusted under 35 U.S.C. 154(b) by 142 days.

(21) Appl. No.: 17/755,206

(22) PCT Filed: Oct. 6, 2020

(86) PCT No.: PCT/EP2020/077956
§ 371 (c)(1),
(2) Date: Apr. 22, 2022

(87) PCT Pub. No.: WO2021/083621
PCT Pub. Date: May 6, 2021

(65) Prior Publication Data
US 2022/0364664 A1    Nov. 17, 2022

(30) Foreign Application Priority Data
Oct. 30, 2019 (DE) ...................... 10 2019 216 782.9

(51) Int. Cl.
*F16L 37/091* (2006.01)
*B29C 45/16* (2006.01)
(Continued)

(52) U.S. Cl.
CPC ........ *F16L 37/091* (2013.01); *B29C 45/1671* (2013.01); *B29L 2031/24* (2013.01); *F16L 37/0985* (2013.01)

(58) Field of Classification Search
CPC . F16L 37/091; F16L 37/0985; F16L 37/0847; F16L 37/086; F16L 37/0885
See application file for complete search history.

(56) References Cited

U.S. PATENT DOCUMENTS 5,704,658 A    1/1998  Tozaki et al.
6,062,537 A *  5/2000  Chih ................... F16L 37/0985
(Continued)

FOREIGN PATENT DOCUMENTS

AT        517085 B1    11/2016
DE    102017212004 A1   1/2019
(Continued)

OTHER PUBLICATIONS

International Search Report dated Dec. 18, 2020 of International Application PCT/EP2020/077956 on which this application is based.
(Continued)

*Primary Examiner* — William S. Choi
(74) *Attorney, Agent, or Firm* — Gregory J. Adams; Richard A. Wolf

(57) ABSTRACT

A reversibly detachable fluid-line coupling having a coupling sleeve, a locking component and a coupling plug. The locking component is in the form of a flat, open spring-steel ring has latching claws projecting radially into the interior of the spring-steel ring and distributed over the circumference of the spring-steel ring and has axially oriented support tongues, wherein, in the region of the coupling head, the locking component resiliently surrounds the coupling head and the latching claws project into the interior of the coupling sleeve through the slots in the coupling head and the support tongues of the spring-steel ring correspond to the support webs of the coupling head and in each case one support tongue is assigned to one support web.

15 Claims, 7 Drawing Sheets

(51) Int. Cl.
*F16L 37/098* (2006.01)
*B29L 31/24* (2006.01)

(56) References Cited

U.S. PATENT DOCUMENTS

| | | | |
|---|---|---|---|
| 6,260,889 B1 | 7/2001 | Tozaki et al. | |
| 10,006,577 B2 * | 6/2018 | Meister | F16L 37/0985 |
| 2006/0220380 A1 * | 10/2006 | Yoshino | F16L 37/0985 |
| 2018/0299051 A1 | 10/2018 | Baldreich et al. | |

FOREIGN PATENT DOCUMENTS

| | | |
|---|---|---|
| EP | 0719971 A1 | 7/1996 |
| EP | 0926420 A2 | 6/1999 |

OTHER PUBLICATIONS

Chinese Office Action dated Jun. 28, 2023 corresponding to Chinese Patent Application No. 202080075954.2.

* cited by examiner

FLUID LINE COUPLING

BRIEF SUMMARY

The invention relates to a reversibly detachable fluid-line coupling, at least having a coupling sleeve, a locking element and a coupling plug.

Fluid-line couplings of the stated type are used in multiple applications. One important field of application is automotive engineering. There, use is made predominantly of VDA couplings, that is to say couplings with standardized connection geometries.

In the application in cooling-water lines, owing to the relatively low loading prevailing there, the couplings are predominantly able to be formed completely from plastic, which yields an advantage in terms of cost and weight. DE 10 2017 212 004 A1 has disclosed a coupling of said type.

In the area of charge-air lines, by contrast, intense dynamic pressure loading and high temperatures prevail. The stated couplings are therefore commonly formed partly or wholly from metal or with metal reinforcement. AT 517085 B1 has disclosed a generic coupling of said type with a metal-reinforced coupling sleeve.

Therefore, in the area of charge-air lines, the current solutions only sporadically permit charge-air couplings composed of plastic. If the loads of pressure, temperature and dynamic movements are too high, the plug-in systems at the coupling head fail. The coupling head ruptures at the engagement points of the locking element. The rigid connection of coupling body and connecting piece, which have to be joinable within the manufacturing tolerances, results in punctiform loading. In some solutions, this has been compensated by an additional, inner ring. In the case of plastic couplings, this can be compensated by a wider bearing surface, so that the surface contact pressure is not too great. The main problem is that motor movement and, additionally, the widening of the hoses result in forces which tilt the coupling and connecting piece within the joining tolerance. This results in punctiform overloading.

The invention was based on the object of providing a fluid-line coupling of the type described in the introduction that can be constructed from plastic while avoiding the stated difficulties.

Said object is achieved in that the coupling has at least two ring-like coupling parts, namely a coupling head and a coupling body, wherein coupling head and coupling body are formed from plastic and are connected in a fluid-tight and non-detachable manner to form a tubular coupling sleeve which is suitable for plugging-in of the coupling plug and which has a first opening, assigned to the coupling head, for plugging-in of the coupling plug and has a second opening, assigned to the coupling body, for connection of further lines, wherein the coupling head has circumferentially oriented slots and ring segment-like, radially outwardly pointing support webs, and the locking component is in the form of a flat, open spring-steel ring which has latching claws projecting radially into the interior of the spring-steel ring and distributed over the circumference of the spring-steel ring and which has axially oriented support tongues, wherein, in the region of the coupling head, the locking component resiliently surrounds the coupling head in such a way that the latching claws project into the interior of the coupling sleeve through the slots in the coupling head and the support tongues of the spring-steel ring correspond to the support webs of the coupling head in such a way that in each case one support tongue is assigned to one support web.

The coupling plug, which may be formed for example in accordance with the VDA guidelines, can be plugged into a coupling of said type. The conical part of the coupling plug, during the plugging of the latter into the coupling sleeve, pushes the latching claws outward. Upon reaching of the intended latching position, the latching claws then snap into a latching groove of the coupling plug. Under axial loading of the coupling plug with respect to the coupling sleeve, the locking component can, by way of its support tongues, then be supported against the support webs of the coupling head such that an areally distributed, rather than punctiform, introduction of force into the coupling head is realized. In this way, the loading of the coupling head is reduced such that even plastics may be used as coupling material.

In one refinement of the invention, the coupling head is of conical form at least in the region provided for being surrounded by the locking component, wherein the larger diameter of the cone is assigned to the plug-in opening of the coupling plug.

If the loading of the coupling does not take place in a purely axial manner, then slight tilting of the plugged-in coupling plug in the coupling head can occur. This leads to initially unilateral tensile loading between coupling head and coupling plug. This is also accompanied by the locking component initially being supported only at one point on the circumference of the coupling head.

With a rigid connection, despite support of the locking component via the support tongues, this can lead to local overloading. The conicity of the coupling head, however, makes possible elastic tilting of the latching claws, since also it is possible for the spring-steel ring to be locally deformed in an elastically undulating manner into the intermediate space formed as a result of the conicity of the coupling head. This leads to it being possible for the adjacent latching claws to also undergo, in succession, a corresponding elastic deformation, so that, even in the event of tilting, a more uniform introduction of force into the coupling head is possible.

In one refinement of the invention, at their respective radially outer ends, the support webs of the coupling head have blocking noses which point axially back from the plug-in opening of the coupling sleeve and which are spaced apart radially from the coupling head, wherein the spacing between blocking noses and coupling head is suitable for the engagement of the support tongues of the locking component.

The blocking noses can prevent the support tongues from sliding radially outward over the support webs in the case of high loading.

In one refinement of the invention, the support tongues of the locking component, at their ends which are assigned to the support webs of the coupling head, are beveled in a circumferential direction of the coupling sleeve and the support webs of the coupling head each have a slope which corresponds to the bevel of the support tongues, wherein the slopes are configured in the manner of a right-hand thread and in the manner of a left-hand thread and there are an equal number of slopes oriented to the left and slopes oriented to the right.

The slopes result in forces being applied to the spring-steel ring in the circumferential direction under axial load. The fact that the slopes act in a right-handed manner at one side and in a left-handed manner at the other side means that, for a corresponding sequence of slopes in the circumferential direction, a closing force in the direction of the opening of the locking component can be generated.

In one refinement of the invention, the latching claws of the locking component, in each case in pairs, have different radial lengths.

In order for it to be possible for the coupling plug to be plugged into the coupling head, it is necessary for the locking component to firstly be widened. This occurs in that the coupling plug, when being plugged in, radially outwardly displaces, by way of its cone, the latching claws projecting into the coupling sleeve. In order to keep the plug-in force as small as possible, it is expedient not to move all the latching claws simultaneously. The different lengths of the latching claws make possible a kind of stepwise widening of the locking component. The pairwise arrangement of the latching claws of differing lengths over the circumference ensures a defined symmetrical widening.

In one refinement of the invention, the locking component has, in relation to the coupling head, a rotation-prevention means.

The rotation-prevention means improves the symmetry and sequence of the widening of the locking component.

In one refinement of the invention, at their radially inner ends, the latching claws have blocking noses which point axially back from the plug-in opening of the coupling sleeve.

The risk of pushing the locking component off from the coupling head is greatest during the plugging-in of the coupling plug. During the plugging-in, the locking component is pushed axially back from the plug-in opening of the coupling sleeve. At the same time, the latching claws are displaced radially outward. The blocking noses ensure that, when a coupling plug is being plugged in, the latching claws cannot slide out from the slots in the coupling head.

In one refinement of the invention, the coupling head has ring segment-like blocking webs which are spaced apart axially from its plug-in opening and which point radially outward, wherein the axial spacing between the support webs and the blocking webs is of such a size that the locking component comes to be situated in the spacing with axial play.

The blocking webs additionally provide for a defined axial position of the locking component during plugging-in of the coupling element, too.

In one refinement of the invention, in its transition regions to the in each case radially inwardly projecting latching claws, the flat, open spring-steel ring has beads which reinforce the transition region.

Beads of said type provide for good transmission of forces from the latching claws into the flat, open spring-steel ring, so that said regions are secured well against fatigue fracture.

In one refinement of the invention, the radially inwardly projecting latching claws have recesses, and, in the region of the slots, the coupling head has saddle-shaped tips at one end, situated in the circumferential direction, of the respective slots, wherein recesses and tips correspond in terms of their shaping and the open spring ring can be opened manually beyond an opening amount that is achievable when the coupling plug is plugged in, wherein the recesses of the latching claws come to be situated against the tips of the coupling head, so that, in this open position, the spring-steel ring latches in.

An opening of said type allows a worker, for example during maintenance work, to manually open the locking component and latch in the latter in the open position, so that a subsequent closure during re-mounting is facilitated. The latching-in can then be eliminated again by the worker by simple displacement of the locking component.

In one refinement of the invention, the coupling head has beveled, radially inwardly projecting, axially oriented support struts which are spaced apart from its plug-in opening, wherein the bevel is configured in such a way that, as the distance from the plug-in opening increases, the support struts project increasingly further radial inward.

Support struts of said type serve for preventing the conical coupling plug, upon attainment of a pre-defined push-in depth, from being pushed too far into the interior of the coupling sleeve, in order to avoid damage to the coupling sleeve.

In one refinement of the invention, at its end facing away from the coupling head, the coupling body has a connection region with a pushed-on onward-leading fluid line, wherein connection region and fluid line are connected to one another in a fluid-tight and materially bonded manner by way of a plastic encapsulation.

An arrangement of said type has the advantage that, during the production of the fluid-line coupling according to the invention, the further fluid line, for example a hose, can, directly, also be attached.

In one refinement of the invention, at its end facing away from the coupling head, the coupling body has a further fluid line which is connected in a materially bonded and fluid-tight manner to the coupling body by way of injection-molding directly onto the coupling body.

Direct injection-molding of the further fluid line to the coupling body makes it possible to dispense with a separate connection. The further fluid line may, for example as a blow-molded plastic line, also be formed at one end as a coupling body.

The invention furthermore relates to an apparatus for producing a fluid-line coupling according to the invention of the above-described type.

The invention was based on the object of providing an apparatus by way of which the production of a fluid-line coupling according to the invention with as few working steps as possible is possible.

Said object is achieved in that the apparatus comprises at least one multi-stage injection-molding tool, at least one folding-over device and at least one stamping and bending tool.

With the multi-stage injection-molding tool, coupling head and coupling sleeve can be co-molded in a two-stage injection-molding process, wherein for example firstly the coupling head can be injection-molded in a first stage and then, by means of a folding-over device, can be folded over in the following stage, in which the coupling sleeve can then be directly injection-molded onto the coupling head. Here, the injection-molding heat from the first part can facilitate the co-molding of the two parts in the second stage. It goes without saying that the reverse order is also possible.

In parallel with this, a locking component can be produced as a split spring-steel ring with latching claws in the stamping and bending tool, which locking component can be mounted on the coupling head after the second injection-molding stage by means of a further folding-over device.

In a further injection-molding stage, it is possible by way of the apparatus according to the invention to connect a fluid line plugged onto the coupling body to the coupling body in a fluid-tight and materially bonded manner by means of annular encapsulation in this injection-molding stage.

The invention furthermore relates to a method for producing the fluid-line coupling according to the invention.

The invention was based on the object of providing a method by way of which inexpensive production of the fluid-line coupling according to the invention is possible.

This object is achieved by the method having at least the following working steps, specifically:

A) injection-molding in each case one coupling head and one coupling body in a first injection-molding stage of a production apparatus, B) stamping and bending a locking component in the form of an open spring-steel ring with latching claws in a stamping and bending tool of the production apparatus, C) folding over the coupling head and the coupling body in a common second injection-molding stage of the production apparatus, E1) co-molding the coupling body and the coupling head to form a coupling sleeve in the second injection-molding stage, with mounting of the locking component on the coupling head.

By way of this method, direct production of the finished fluid-line coupling is possible in a few working steps and in just one apparatus.

In one refinement of the invention, the method has at least further working steps, specifically D) pushing on a further fluid line (4) at that opening of the coupling sleeve (2, 3) which is provided for connection of further fluid lines (4), E2) co-molding the coupling body (3) and the coupling head (2) to form a coupling sleeve (2, 3) in the second injection-molding stage, with mounting of the locking component (7) on the coupling head (2) and encapsulation (5) of the fluid-line coupling (1) and the further fluid line (4) in the region of that opening of the coupling sleeve (2, 3) which is provided for connection of further fluid lines (4).

In this way, fastening of the further fluid line, for example by way of hose clips, at a later stage is not necessary.

BRIEF DESCRIPTION OF THE SEVERAL VIEWS OF THE DRAWING(S)

Figure 4:
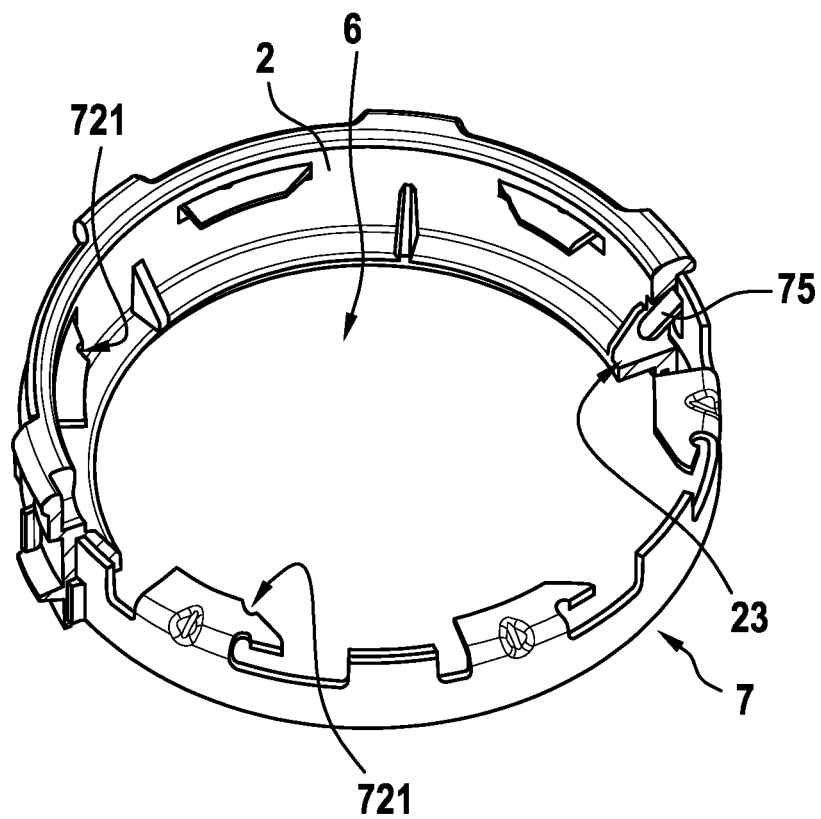

FIG. 4 illustrates, perspectively as a partial section, the coupling head 2 with loss of component 7 when looking into the push-in opening 6.

Figure 5:
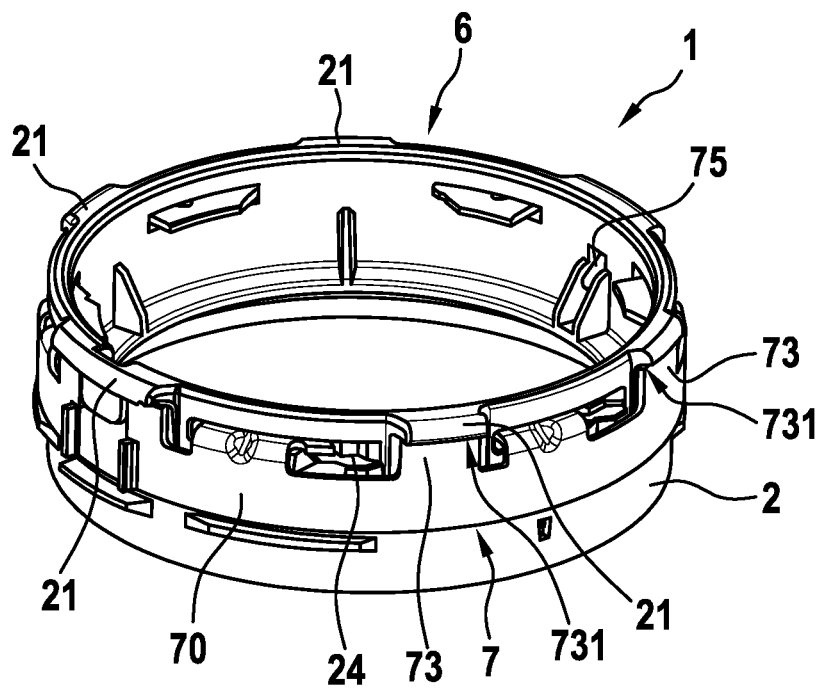

FIG. 5 shows the coupling head 2, likewise when looking into the push-in opening 6.

Figure 6:
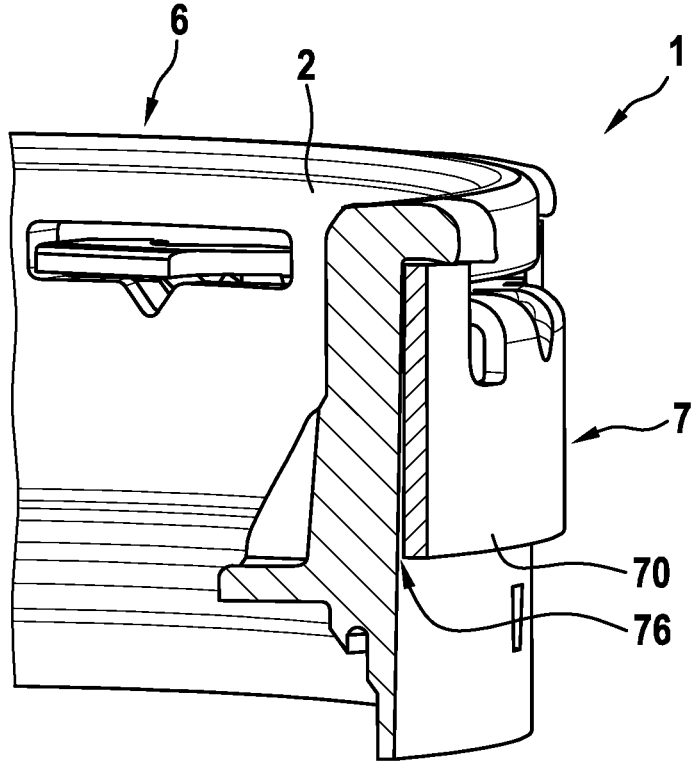

FIG. 6 shows a partial detail of the coupling head 2 with the locking component 7.

Figure 7:
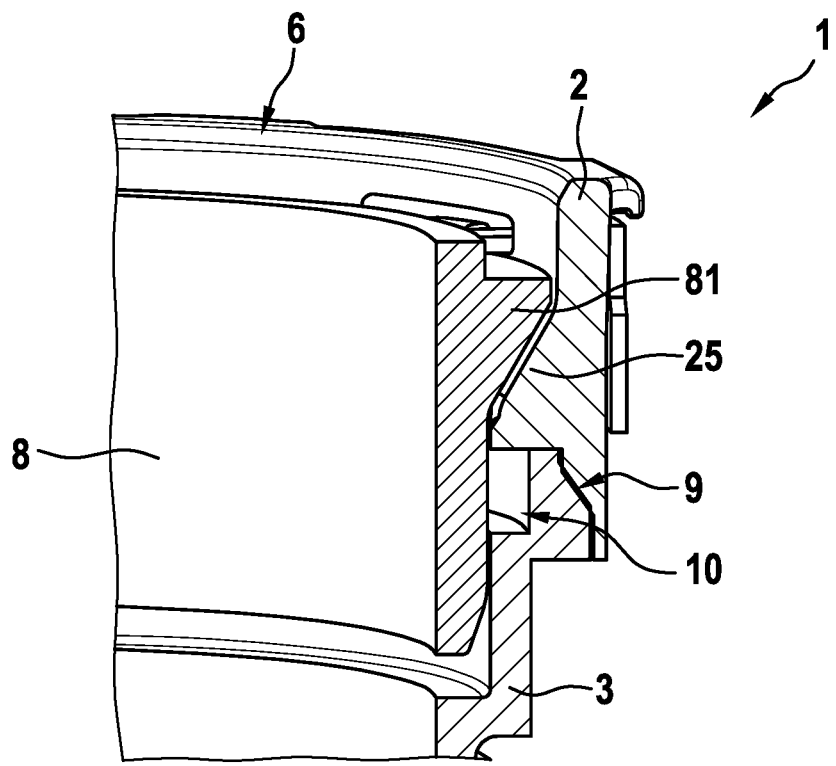

FIG. 7 shows a partial section of the fluid-line coupling 1 according to the invention with a plugged-in coupling plug 8.

Figure 8:
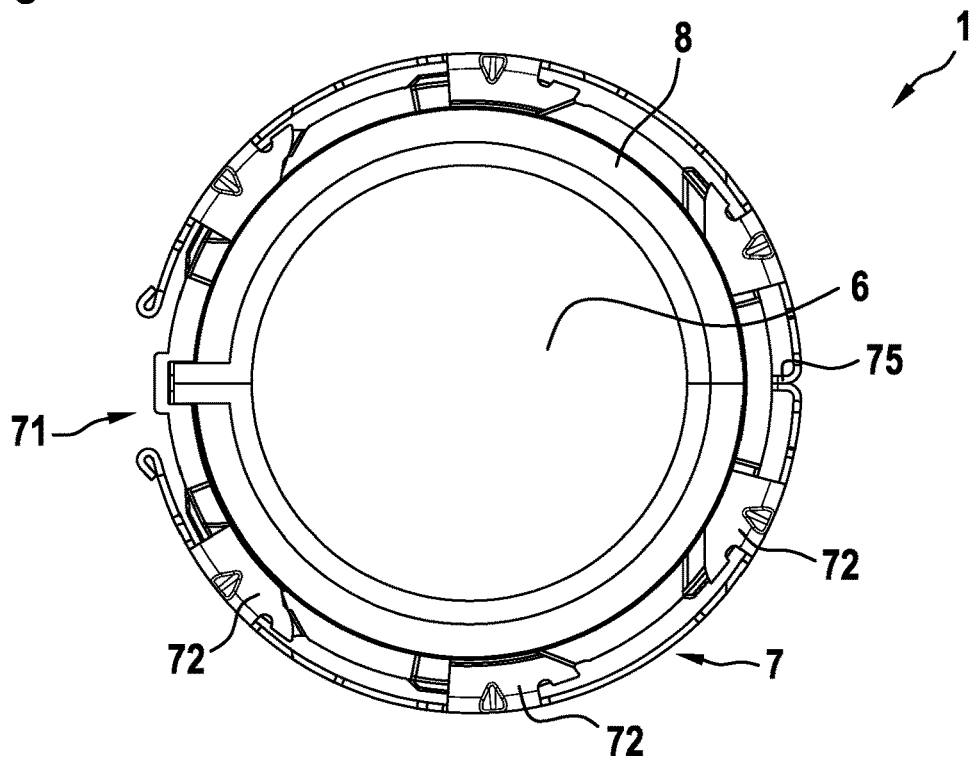

FIG. 8 shows the fluid-line coupling 1 according to the invention in a cross section.

Figure 9:
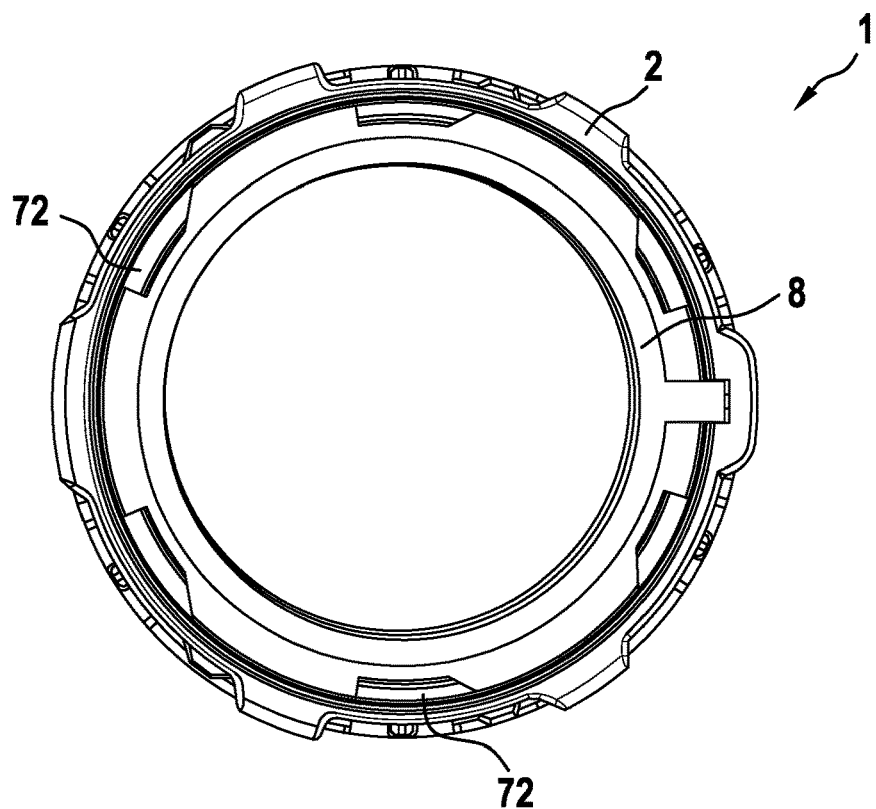

FIG. 9 shows the fluid-line coupling 1 in a locked position.

Figure 10:
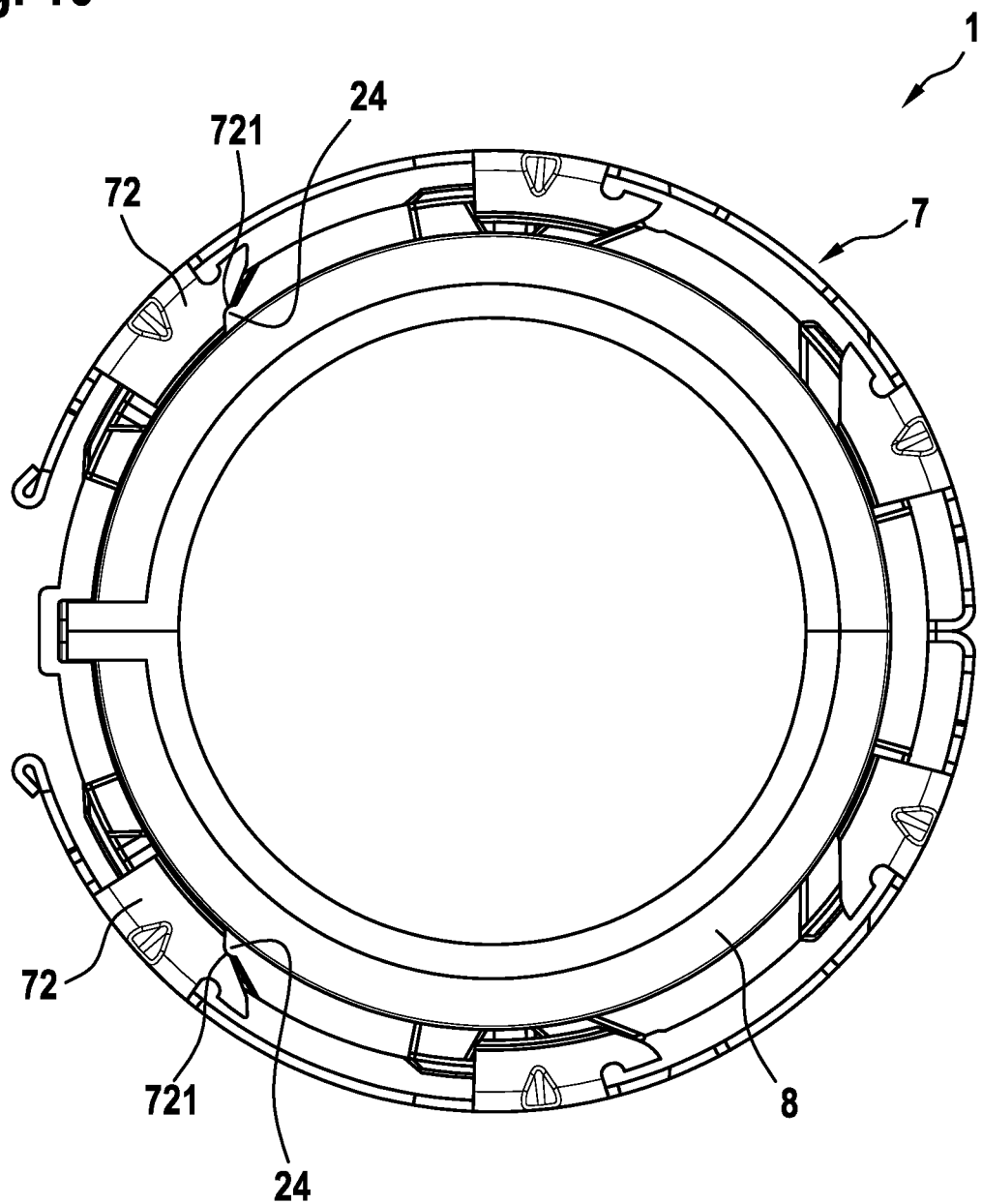

FIG. 10 shows the fluid-line coupling in a manually opened position.

Figure 11:
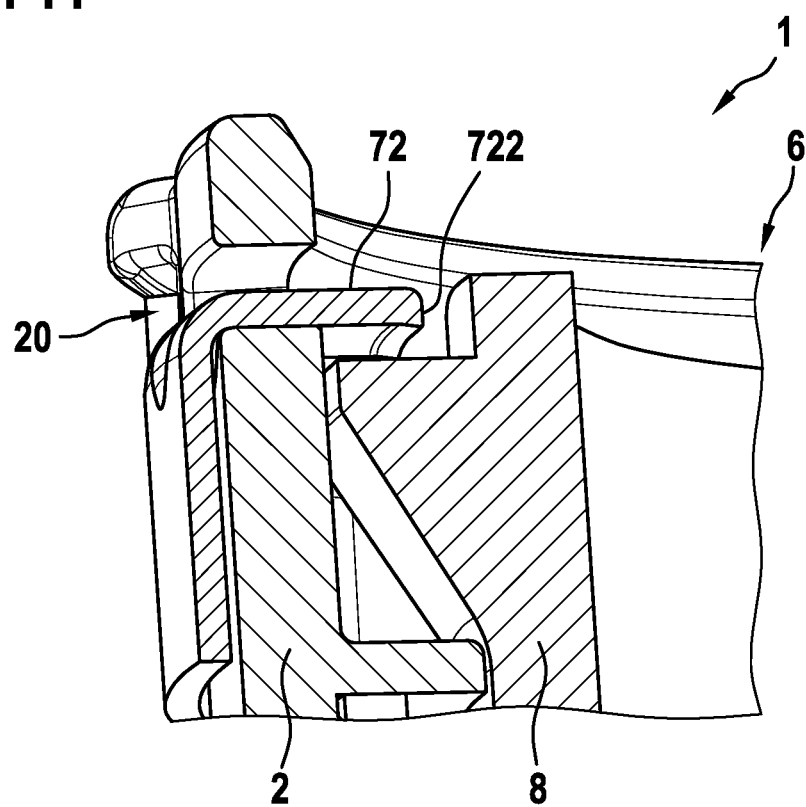

FIG. 11 shows a section through the fluid line coupling in the region of a latching claw on an enlarged scale.

DETAILED DESCRIPTION

An exemplary embodiment of the invention will be discussed in more detail below on the basis of the drawing.

Figure 1:
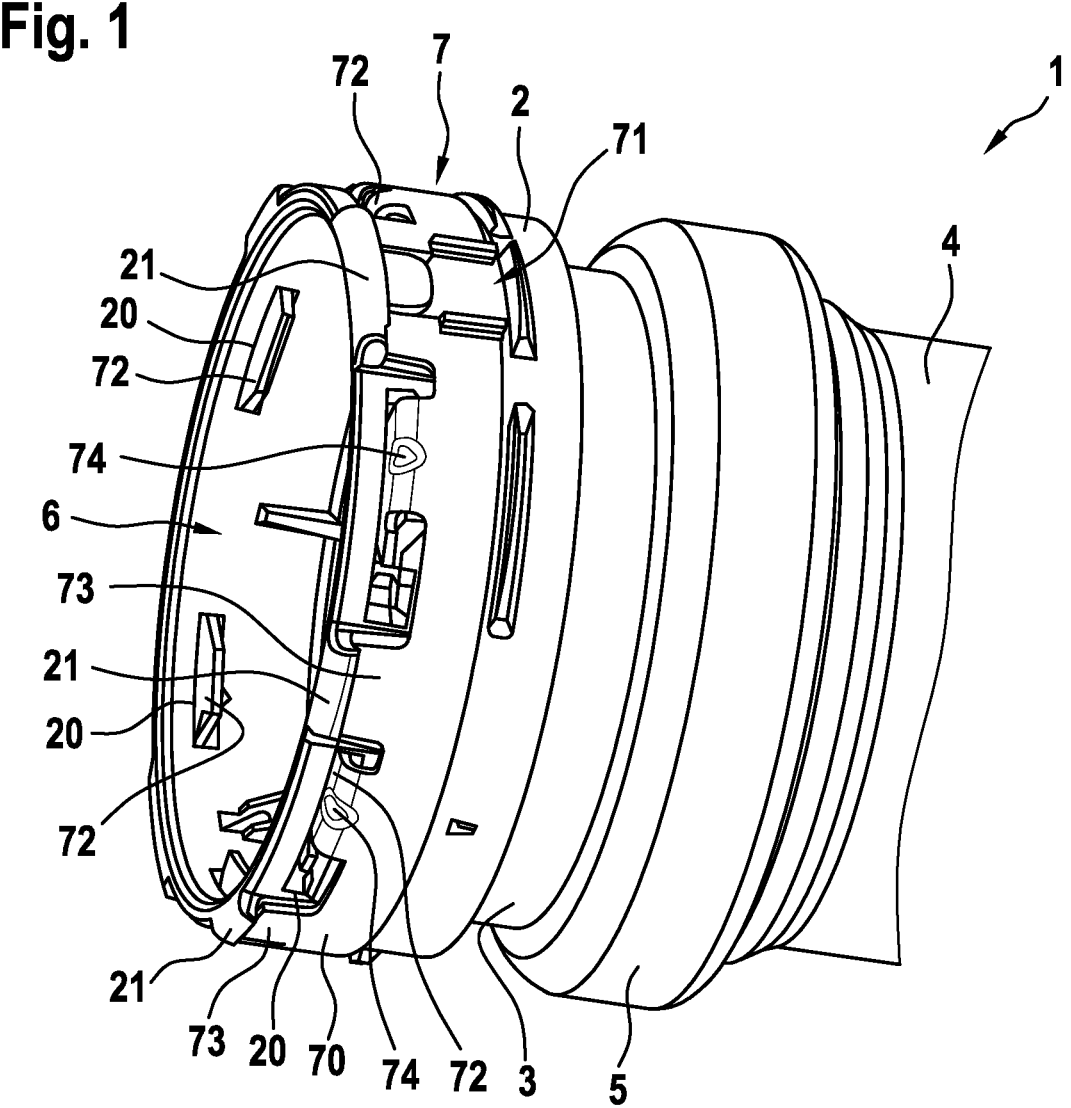
FIG. 1 shows a fluid-line coupling 1 according to the invention in a perspective illustration.

FIG. 1 shows a fluid-line coupling 1 according to the invention in a perspective illustration. The fluid-line coupling 1 has a coupling head 2 and a coupling body 3, wherein coupling head 2 and coupling body 3 are connected to one another in a fluid-tight and non-detachably materially bonded manner.

An onward-leading fluid line, a plastic hose 4 in this case, is pushed onto the coupling body 3. The plastic hose 4 is sealed off by a plastic ring 5 and is thereby connected in a fluid-tight and materially bonded manner to the coupling body 3.

Coupling head 2, coupling body 3 and plastic ring 5 are produced in a common apparatus (not shown here) by injection molding.

The fluid-line coupling 1 has a first end 6 for plugging-in of a coupling plug (not shown here). A locking component 7 which is in the form of a stamped and bent part is arrange on the coupling head 2. A spring-steel ring 70 forms the axial part of the locking component 7. The spring-steel ring 70 surrounds the coupling head 2 and has a slot 71. The slot 71 is necessary for being able to resiliently open out the spring-steel ring 70 for the purpose of mounting and of ensuring its functionality.

The coupling head 2 has distributed over the circumference a predetermined number of slots 20 which extend in a circumferential direction. The locking component 7 has latching claws 72 which extend radially into the interior of the fluid-line coupling 1 through the slots 20. The locking component 7 moreover has support tongues 73 which extend axially in the direction of the plug-in opening 6.

The coupling head 2 has distributed over the circumference a predetermined number of support webs 21 which are formed in the manner of ring segments and which correspond in terms of number and position to the support tongues 73.

At each latching claw 72, the locking component 7 has a reinforcement bead 74 in the transition from the latching claw 72 into the spring-steel ring 70, the reinforcement beads reinforcing the latching claws 72 with respect to the spring-steel ring 70.

Figure 2:
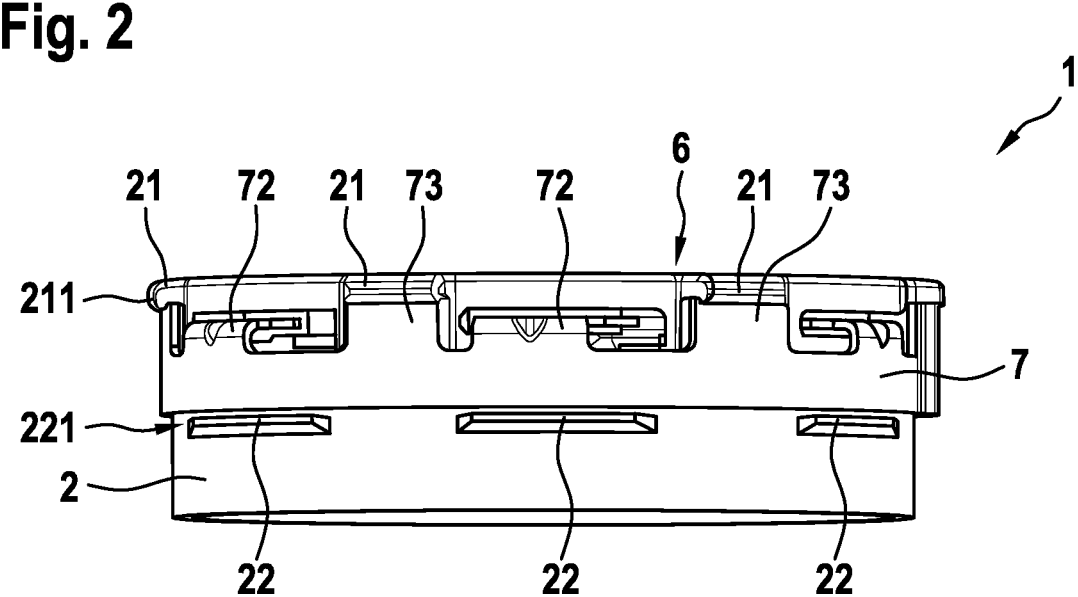
FIG. 2 shows the coupling head 2 in a partial detail as a plan view.

FIG. 2 shows the coupling head 2 in a partial detail as a plan view. The view shows the fluid-line coupling 1 in a locked state. In this state, the fluid-line coupling 1 is subjected to tensile load axially by a coupling plug (not shown here) that has been plugged into the plug-in opening 6, this meaning that the locking component 7 is pulled in the direction of the plug-in opening 6 via the latching claws 72. Here, the support tongues 73 are pulled against the support webs 21 and are supported there.

At their in each case radially outer end, the support webs 21 have blocking noses 211 which point axially back from the plug-in opening 6. In this state, the support tongues 73 engage between the coupling head 2 and blocking noses 211, with the result that the support tongues cannot yield radially outward.

The coupling head 2 has ring segment-like blocking webs 22 which are spaced apart axially from the plug-in opening 6 and which point radially outward. In the position shown, the locking component 7 is pulled in the direction of the plug-in opening 6. In this way, on the other hand 21, a gap is formed between the spring-steel ring 70 and the blocking webs.

Figure 3:
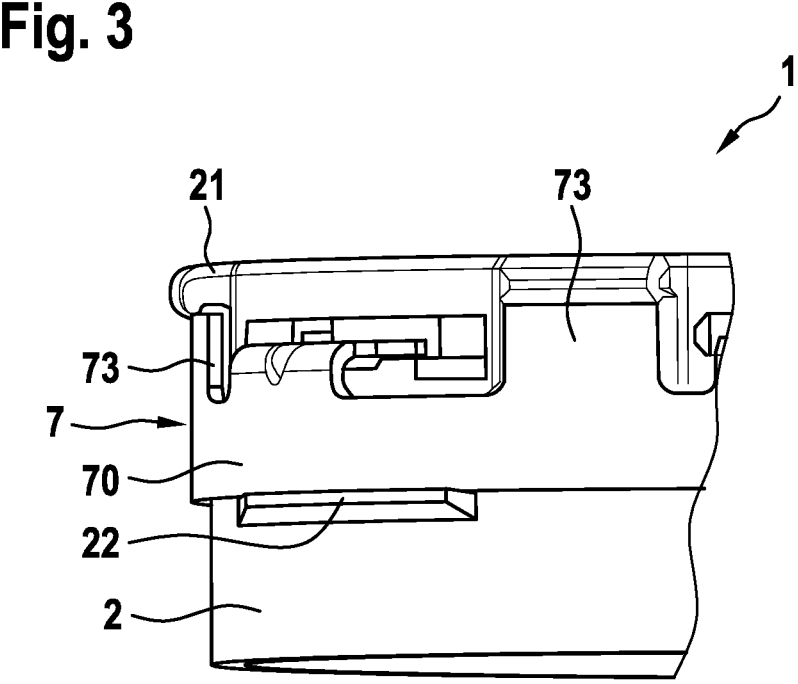
FIG. 3 shows a sub-portion of the fluid-line coupling 1.

FIG. 3 shows a sub-portion of the fluid-line coupling 1 according to the invention. The state shown here shows the coupling head 2 with locking component 7 in a state which represents the beginning of the pushing-in of a coupling plug (not shown here).

The locking component 7 is pushed axially in a direction away from the push-in opening, and abuts against the blocking webs 22 by way of its spring-steel ring 70. The support tongues 73 do not engage behind the blocking noses 211. Support webs 22. In this way, resilient opening-out of the spring-steel ring 70 in a radial direction is possible.

FIG. 4 illustrates, perspectively as a partial section, the coupling head 2 with loss of component 7 when looking into the push-in opening 6. A coupling plug is not illustrated. At a predetermined point on its circumference, the coupling head 2 has an aperture 23 into which a rotation-prevention tongue 75 of the locking component 7 engages. In this way, the locking component 7 is secured against rotation on the coupling head 2.

Some of the latching claws 72 have recesses 721 at their radially inner ends.

FIG. 5 shows the coupling head 2, likewise when looking into the push-in opening 6. Here, too, a coupling plug is not shown. The support webs 21 are arranged in such a way that they are situated obliquely in the circumferential direction, that is to say have a thread-like lead. The assigned support tongues 73 have correspondingly beveled ends 731.

The lead of the support webs 21 is configured in a manner analogous to a left-hand thread at one side and in a manner analogous to a right-hand thread at the other side. The lead direction switches at the rotation-prevention tongue 75, so that, by way of the leads of the support webs 21 with the leads of the support-tongue ends 731, under tensile loading, that is to say when the support-tongue ends 731 are pressed against the support webs 21, a circumferential force which is directed in the direction of a closure of the spring-steel ring 70 can be generated such that the locking component 7 does not open under loading.

In the region of the run-out of the gaps 21 in the coupling head 2, the coupling head 2 has, in part, saddle-shaped, radially outwardly projecting tips 24. In the case of manual opening of the locking component 7, the recesses 721 of the latching claws 72 can engage with the tips 24 with snap-in action, so that the locking component 7 can remain in the opened position.

FIG. 6 shows a partial detail of the coupling head 2 with the locking component 7. The coupling head 7 is of conical form, so that, between the coupling head 2 and the spring-steel ring 70, there is a gap 76 which decreases in the direction of the plug-in opening 6. Said gap 76 makes possible elastic, undulating deformation of the spring-steel ring 70.

FIG. 7 shows a partial section of the fluid-line coupling 1 according to the invention with a plugged-in coupling plug 8. The coupling head 2 and the coupling body 3 are connected to one another in a materially bonded manner by injection molding and form an annular gap 10 at a seam 9, which annular gap is provided for accommodating a seal (not shown here).

The coupling head 2 has distributed over its circumference and spaced apart from the push-in opening 6 radially inwardly projecting, axially extending, beveled support struts 25, of which only one is illustrated here.

The support struts 25 serve for supporting the coupling plug 8, with a conical portion 81, in the plugged-in state, such that said coupling plug cannot be pushed further into the fluid-line coupling 1.

FIG. 8 shows the fluid-line coupling 1 according to the invention in a cross section. The coupling plug 8 has been plugged into the coupling head 2, but has not yet been latched. The locking component 7 has been resiliently opened out.

The latching claws 72 have different radial lengths, that is to say they project into the plug-in opening 6 to different extents. The latching claws 72 which are directly adjacent to the gap 71 have the largest radial length, said latching claws being the first to be contacted, and displaced outward, by the coupling plug 8.

The latching claws 72 which are situated opposite the gap 71 have the second largest radial length. Said latching claws are the first to be displaced outward by the coupling plug 8 during further pushing-in. The remaining latching claws 72 have a significantly smaller radial length and are not contacted by the coupling plug 8.

This arrangement is necessary in order for the locking component 7 to be able to be opened in such a way that the coupling plug 8 can be pushed in completely. Thus, during the pushing-in of the coupling plug 8, the locking component 7 undergoes both a radial opening movement and an eccentric displacement and is guided in a defined position by way of the rotation-prevention means 75.

FIG. 9 shows the fluid-line coupling 1 in a locked position. The latching claws 72 have snapped back into their initial position and lock the coupling plug 8 such that the latter cannot be pushed out of the coupling head 2 again.

FIG. 10 shows the fluid-line coupling in a manually opened position. The coupling plug 8 is still pushed in, and the locking component 7 has been opened completely, that is to say beyond the open position which can be reached by way of the contact with the coupling plug 8. By way of this opening, the recesses 721 of the latching claws 72 latch onto the tips 24 of the coupling head 2, so that the locking component 7 does not snap back into its initial position of its own accord. Owing to the low height of the tips 24, the latching can be unlatched very easily, such that the vibration during renewed pushing-in of the coupling plug 8 can already suffice for this purpose.

A section through the fluid-line coupling 1 according to the invention in the region of a latching claw 72 is illustrated on an enlarged scale in FIG. 11. The coupling plug 8 is pushed in, and the latching claws 72 are in the locking position.

At their radially inner ends, the latching claws 72 each have a blocking nose 722 which is directed axially back from the push-in opening 6. The blocking noses 722 here make it more difficult for the latching claws 72 to slide out from the slots 20 of the coupling head 2 during pushing-in of the coupling plug 8, since they get caught at the edge of the slot 20.

LIST OF REFERENCE SIGNS

Part of the Description

1 Fluid-line coupling
2 Coupling head
20 Slot in the coupling head 2
21 Support webs
211 Blocking noses of the support webs 21
22 Blocking webs
23 Aperture
24 Tips
25 Support struts
3 Coupling body
4 Plastic hose
5 Plastic ring
6 Plug-in opening
7 Locking component
70 Spring-steel ring of the locking component 7
71 Slot in the spring-steel ring 70
72 Latching claws
721 Recesses of the latching claws 72

722 Blocking noses of the latching claws 72
73 Support tongues
731 Ends of the support tongues 73
74 Reinforcement bead
75 Rotation-prevention tongue
76 Conical gap
8 Coupling plug
81 Cone of the coupling plug 8
9 Seam between coupling head 2 and coupling body 3
10 Annular gap

The invention claimed is:

1. A reversibly detachable fluid-line coupling comprising a coupling sleeve, a locking component and a coupling plug, wherein the reversibly detachable fluid-line coupling has a coupling head and a coupling body, wherein the coupling head and the coupling body are formed from plastic and are connected in a fluid-tight and non-detachable manner to form the coupling sleeve which is suitable for plugging-in to the coupling plug to plug into and which has a first opening as plug-in opening, assigned to the coupling head, for plugging-in to the coupling plug, and has a second opening, assigned to the coupling body, for connection with further lines;
   wherein the coupling head has circumferentially oriented slots and ring segmented, radially outwardly pointing support webs, and wherein the locking component is in the form of a flat, open spring-steel ring which has latching claws projecting radially into an interior of the spring-steel ring and distributed over a circumference of the spring-steel ring, and which has axially oriented support tongues; and,
   wherein, in the region of the coupling head, the locking component resiliently surrounds the coupling head in such a way that the latching claws project into an interior of the coupling sleeve through slots in the coupling head, and wherein the support tongues of the spring-steel ring correspond to the support webs of the coupling head in such a way that in each of the support tongues is assigned to one of the support webs.

2. The fluid-line coupling as claimed in claim 1, wherein the coupling head is of conical form at least in a region provided for being surrounded by the locking component, and wherein a larger diameter of the cone is assigned to the first opening.

3. The fluid-line coupling as claimed in claim 1, wherein, at respective radially outer ends, the support webs of the coupling head have blocking noses which point axially back from the plug-in opening of the coupling sleeve, and which are spaced apart radially from the coupling head, and wherein spacing between the blocking noses and the coupling head is suitable for engagement of the support tongues of the locking component.

4. The fluid-line coupling as claimed in claim 1, wherein the support tongues of the locking component, at their ends which are assigned to the support webs of the coupling head, are beveled in a circumferential direction of the coupling sleeve and the support webs of the coupling head each have a slope which corresponds to the bevel of the support tongues, wherein the slopes are configured in the manner of a right-hand thread and in the manner of a left-hand thread and there are an equal number of left oriented slopes and right orientated slopes.

5. The fluid-line coupling as claimed in claim 1, wherein the latching claws of the locking component, in each case in pairs, have different radial lengths.

6. The fluid-line coupling as claimed in claim 1, wherein the locking component has, in relation to the coupling head, a rotation-prevention tongue.

7. The fluid-line coupling as claimed in claim 1, wherein, at their radially inner ends, the latching claws have blocking noses which point axially back from the plug-in opening of the coupling sleeve.

8. The fluid-line coupling as claimed in claim 1, wherein the coupling head has ring segmented blocking webs which are spaced apart axially from plug-in opening, and which point radially outward, and wherein the axial spacing between the support webs and the blocking webs is of such a size that the locking component comes to be situated in the spacing with axial play.

9. The fluid-line coupling as claimed in claim 1, wherein each radially inwardly projecting latching claws include a respective transition region, and wherein the transition regions include a split spring-steel ring that has beads which reinforce the transition regions.

10. The fluid-line coupling as claimed in claim 1, wherein the radially inwardly projecting latching claws have recesses, and, in the region of the slots, the coupling head has saddle-shaped tips at one end, situated in a circumferential direction, of the respective slots, wherein the recesses and the tips correspond in terms of their shaping and the spring-steel ring includes a split and can be opened manually beyond an opening amount that is achievable when the coupling plug is plugged in, and wherein the recesses of the latching claws come to be situated against the tips of the coupling head, so that, in this open position, the spring-steel ring latches in.

11. The fluid-line coupling as claimed in claim 1, wherein the coupling head has beveled, radially inwardly projecting, axially oriented support struts which are spaced apart from the plug-in opening, and wherein the beveled, radially inwardly projecting, axially oriented support struts are configured in such a way that, as the distance from the plug-in opening increases, the support struts project increasingly further radial inward.

12. The fluid-line coupling as claimed in claim 1, wherein, at its end facing away from the coupling head, the coupling body has a connection region with a pushed-on onward-leading fluid line, and wherein the connection region and the fluid line are connected to one another in a fluid-tight and materially bonded manner by way of a plastic encapsulation.

13. The fluid-line coupling as claimed in claim 1, wherein, at its end facing away from the coupling head, the coupling body has a further fluid line which is connected in a materially bonded and fluid-tight manner to the coupling body by way of injection-molding directly onto the coupling body.

14. A method for producing the fluid-line coupling as claimed in claim 1, the method comprising:
   A) injection-molding in each case the coupling head and the coupling body in a first injection-molding stage of a production apparatus;
   B) stamping and bending the locking component in the form of a spring-steel ring with latching claws in a stamping and bending tool of the production apparatus, wherein the spring-steel ring has a split;
   C) folding over the coupling head and the coupling body in a common second injection-molding stage of the production apparatus; and,
   E1) co-molding the coupling body and the coupling head to form the coupling sleeve in the second injection-molding stage, with mounting of the locking component on the coupling head.

15. The method as claimed in claim 14, the method further comprising:
- D) pushing on a further fluid line at the second opening of the coupling sleeve which is provided for connection of further fluid lines.

\* \* \* \* \*